United States Patent [19]

Knapp et al.

[11] Patent Number: 4,474,161

[45] Date of Patent: Oct. 2, 1984

[54] METHOD FOR MIXTURE FORMATION FOR MIXTURE-COMPRESSING INTERNAL COMBUSTION ENGINES AND FUEL SUPPLY SYSTEM FOR PERFORMING THE METHOD

[75] Inventors: Heinrich Knapp, Leonberg; Manfred Lembke, Gerlingen, both of Fed. Rep. of Germany

[73] Assignee: Robert Bosch GmbH, Stuttgart, Fed. Rep. of Germany

[21] Appl. No.: 417,971

[22] Filed: Sep. 14, 1982

[30] Foreign Application Priority Data

Jan. 30, 1982 [DE] Fed. Rep. of Germany ....... 3203179

[51] Int. Cl.³ ............................................ F02M 51/00
[52] U.S. Cl. .................................. 123/478; 123/445; 60/605
[58] Field of Search ............. 123/478, 445, 446, 438, 123/492, 179 L; 60/605

[56] References Cited

U.S. PATENT DOCUMENTS

| | | | |
|---|---|---|---|
| 2,849,992 | 9/1958 | Stillebroer et al. | 60/605 |
| 3,541,784 | 11/1970 | Haase | 60/605 |
| 3,724,435 | 4/1973 | Bier | 123/446 |
| 3,935,847 | 2/1976 | Gamell | 123/445 |
| 4,182,294 | 1/1980 | Emmenthal | 60/605 |
| 4,400,944 | 8/1983 | Iwamoto et al. | 60/605 |

FOREIGN PATENT DOCUMENTS

| | | | |
|---|---|---|---|
| 0074531 | 3/1983 | European Pat. Off. | 60/605 |
| 56-72239 | 6/1981 | Japan | 60/605 |
| 57-135216 | 8/1982 | Japan | 60/605 |

*Primary Examiner*—Parshotam S. Lall
*Attorney, Agent, or Firm*—Edwin E. Greigg

[57] ABSTRACT

A method for mixture formation for mixture-compressing internal combustion engines having a turbocharger and a fuel supply system for performing the method. The fuel supply system serves to regulate the fuel-air mixture in accordance with operating parameters of the engine and includes a first fuel supply element disposed upstream of a throttle valve and a second fuel supply element disposed upstream of a compressor. Below the operating temperature of the engine, fuel is fed only via the first fuel supply element. Above the operating temperature of the engine, the feeding of fuel is effected via the first fuel supply element until such time as the charging range begins, at a predetermined intake manifold pressure ($p_{um}$), and above this pressure only via the second fuel supply element. The transition from one fuel supply element to the other takes place in accordance with a predetermined timed function. As a result, good fuel preparation and good cylinder filling are attained.

21 Claims, 4 Drawing Figures

METHOD FOR MIXTURE FORMATION FOR MIXTURE-COMPRESSING INTERNAL COMBUSTION ENGINES AND FUEL SUPPLY SYSTEM FOR PERFORMING THE METHOD

BACKGROUND OF THE INVENTION

The invention is based on a method for mixture formation for mixture-compressing internal combustion engines and a fuel supply system for performing the method. In known internal combustion engines having turbocharging and fuel injection, the disadvantage exists that the air delivered to the cylinders is heated because of the severe compression, in part to over 100° C., which causes the cylinders to be less completely filled and results in poorer engine efficiency.

OBJECT AND SUMMARY OF THE INVENTION

The method according to the invention has the advantage over the prior art that a longer preparation path is available for the fuel fed via the first fuel supply element from upstream of the throttle valve as far as the individual cylinders of the engine; the result is an increased cooling of the mixture and thus improved filling of the cylinders, while the fuel fed via the second supply element upstream of the compressor, because of its energy requirement during evaporation, cools the compressed air and the compressor. As a result, not only is the service life of the compressor prolonged but more complete filling of the cylinders and an increase in performance are attained, which is also based on the pronounced turbulence and the thus-improved distribution of the mixture to the different cylinders.

Advantageous further developments of and improvements to the method and the fuel supply system are possible. It is particularly advantageous, below the operating temperature of the engine and below a predetermined intake manifold pressure which is slightly above the non-supercharged full load, or in other words is located at the beginning of the charge range, to feed the fuel only directly upstream of the throttle valve, while above the predetermined intake manifold pressure at full load during supercharged operation, the feeding of the fuel should be effected only directly upstream of the compressor. It is furthermore advantageous, when a slow or even a rapid increase in load is taking place from an operating point below the predetermined intake manifold pressure, to reduce the feeding of fuel directly upstream of the throttle valve in accordance with a predetermined function beginning with the attainment of the predetermined intake manifold pressure, and to begin fuel feeding directly upstream of the compressor in an adapted manner and to increase it, in such a manner that the sum of the supplied fuel quantities corresponds to the required fuel quantity. Conversely, where there is a reduction in load from an operating point above the predetermined intake manifold pressure, it is advantageous, beginning with the attainment of the predetermined intake manifold pressure, to change the feeding of fuel in accordance with a predetermined function from upstream of the compressor to upstream of the throttle valve.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
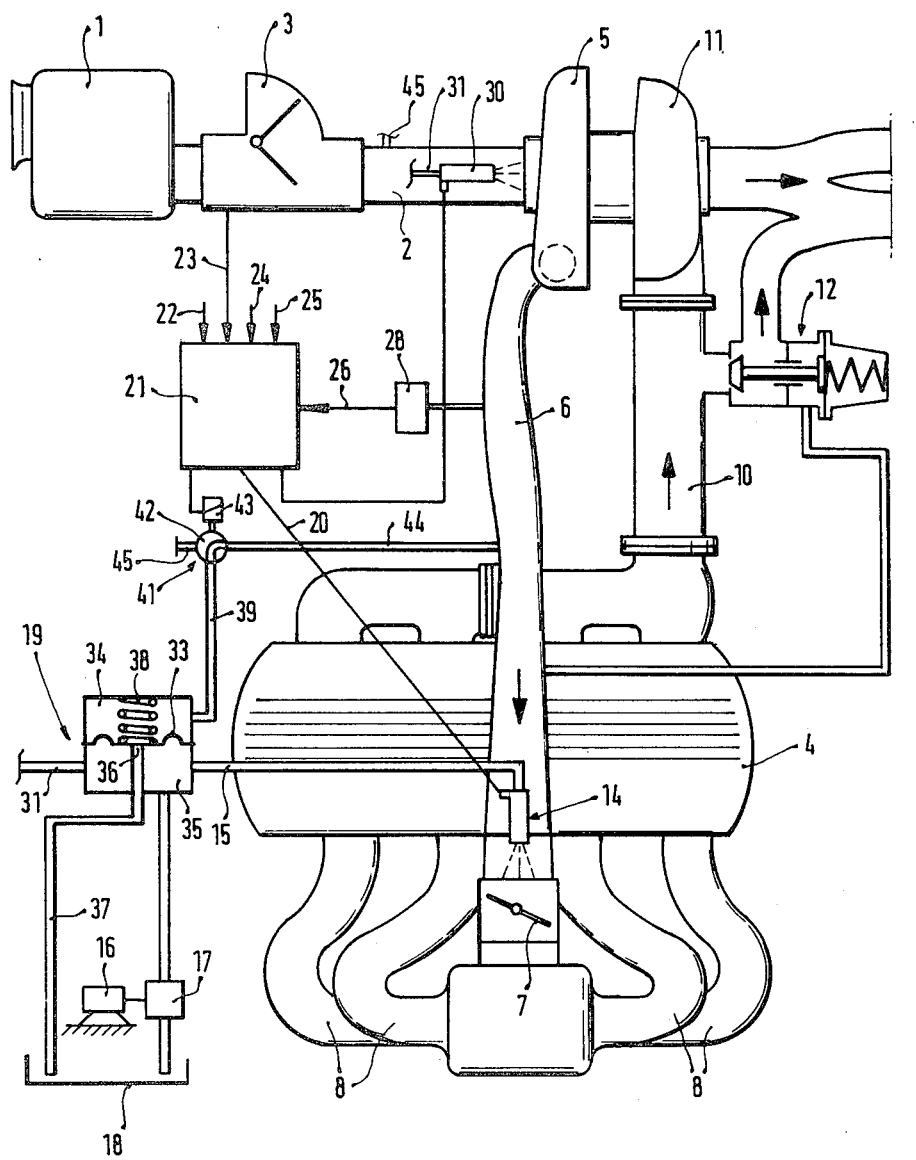
FIG. 1 shows a top plan view of a fuel supply system according to the invention having an internal combustion engine supercharged by means of a turbocharger.

In the fuel supply system shown in FIG. 1, the air required for combustion flows through an air filter 1 into an intake manifold section 2, in which an air flow rate meter 3 of known design, for instance a hot-wire air flow rate meter or a baffle valve air flow rate meter, is disposed. Downstream of the air flow rate meter 3 is a compressor 5 which is arranged to compress the quantity of air aspirated by an internal combustion engine 4. The compressor 5 may for example be a turbocharger of known design, downstream of which the compressed air passes into an intake manifold section 6 having a throttle valve 7. Downstream of the throttle valve 7, individual intake tubes 8 branch off from the intake manifold section 6, leading to the individual cylinders of the engine 4. The illustrated mixture-compressing internal combustion engine 4 having externally supplied ignition is a 4-cylinder engine. An exhaust line 10 leads to an exhaust turbine 11, which is rigidly coupled with the compressor 5 and by means of which heated and highly compressed exhaust gas is driven. A bypass valve 12 is secured to exhaust line 10 and is arranged to open upon attainment of the maximum permissible charge pressure in the intake manifold section 6 to which it is connected and permits a portion of the exhaust gas to bypass the exhaust turbine 11.

Directly upstream of the throttle valve 7, a first injection valve 14 serving as the fuel supply element is disposed in the intake manifold section 6; fuel is capable of being injected via this injection valve 14 directly ahead of the throttle valve 7, preferably into the opening valve gap. The first injection valve 14 is connected with a fuel supply line 15, into which fuel is pumped from a fuel container by a fuel pump 17 driven by an electric motor 16. A pressure regulating valve 19 regulates the fuel pressure in the fuel supply line 15. In the exemplary embodiment of a fuel supply system shown here, the system is an electronic fuel injection system, having a first injection valve 14 embodied as an electromagnetic valve. The triggering of the first injection valve 14 is effected via a trigger line 20 by means of an electronic control unit 21 of known design in accordance with such engine operating parameters as rpm 22, air quantity 23, throttle valve position 24, temperature 25, intake manifold pressure 26 in the intake manifold section 6 and others.

In order to ascertain the intake manifold pressure in the intake manifold section 6 between the compressor 5 and the throttle valve 7, there is a pressure sensor 28 connected with the intake manifold section 6, its electrical output signal 26 being supplied to the control unit 21. Injecting fuel via the first injection valve 14 upstream of the throttle valve 7 has the advantage that because of the longer preparation path up to the cylinders, an increased cooling of the mixture is effected and the cylinder filling is improved.

The compression of the aspirated air by the compressor 5 leads in part to air temperatures above 100° C., which causes a poorer filling of the engine cylinders and a worsening of the engine efficiency on the one hand, and on the other hand is associated with the danger of greater wear of the compressor 5, thus shortening its service life. In accordance with the invention, a second injection valve 30 is therefore likewise disposed upstream of the compressor 5 in the intake manifold section 2, thereby serving as the second fuel supply element, which is supplied with fuel via a branch line 31 of the fuel supply line 15. As a result of the vaporization of the fuel injected via the second injection valve 30 upstream of the compressor 5, heat is drawn from the aspirated air, producing not only a reduction in the compressor temperature but also a reduction in the temperature of the air delivered to the cylinders of the engine 4, so that the individual cylinder filling is more complete, producing an increase in engine performance. Furthermore, because of the turbulence in the compressor good mixture distribution to the individual cylinders is attained. By means of the injection according to the invention, an otherwise conventional charge-air cooler can furthermore be omitted or at least reduced in size. The second injection valve 30 can likewise be embodied electromagnetically and triggered by the electronic control unit 21. The triggering of the second injection valve 30 should be advantageously effected in such a manner that below the operating temperature of the engine, that is, approximately 80° C., no injection is effected via the second injection valve 30. In other words, the second injection valve 30 is closed, and injection is effected exclusively through the first injection valve 14. It is furthermore efficacious in operating ranges from idling up to slightly above the non-supercharged full load, or in other words at the beginning of the supercharging range of the engine, again to prevent injection via the second injection valve 30 and permit injection only via the first injection valve 14. In accordance with the invention, the injection of fuel should move from the first injection valve 14 to the second injection valve 30 only from a point slightly above the non-supercharged full load or in other words at the beginning of the supercharging range, thus producing increased cooling.

The embodiment of a fuel injection system in accordance with the invention having a first injection valve 14 for injecting fuel upstream of the throttle valve 7 and a second injection valve 30 for injection upstream of the compressor 5 is not restricted to use in an electronic fuel injection system. An equivalent embodiment can also provide first and second injection valves in a mechanical fuel injection system, these valves then injecting fuel upstream of the compressor 5 and the throttle valve 7 under the same conditions as described above.

The pressure regulator 19 is embodied as a diaphragm valve by way of example, having a diaphragm 33 embodied as a yielding wall which divides a control chamber 34 from a fuel chamber 35 and cooperates with a valve seat 36 disposed in the fuel chamber 35. Depending upon the position of the diaphragm 33, more or less fuel flows via this valve seat 36 into a return flow line 37 and can flow back to the fuel container 18 from there. A regulating spring 38 which urges the diaphragm 33 in the closing direction of the pressure regulating valve 19 is disposed in the control chamber 34. A pneumatic control line 39 leads from a control chamber 34 to a switchover valve 41, the valve slide 42 of which is actuatable by means of an electromagnetic drive mechanism 43. The electromagnetic drive mechanism 43 is triggerable by the electronic control unit 21 in such a manner that when injection is being effected via the first injection valve 14 the drive mechanism 43 displaces the valve slide 42 into a position in which it connects the pneumatic control line 39 with an intake manifold pressure line 44 leading to the intake manifold section 6 located between the compressor 5 and the throttle valve 7; when injection is being effected via the second injection valve 30, the drive mechanism 43 actuates the valve slide 42 such that the pneumatic control line 39 communicates either with the atmosphere or via a connecting line 45 with the intake manifold section 2 downstream of the air flow rate meter 3. Thus the correct differential pressure for injection at the first and second injection valves is regulated by means of the pressure regulator 19. The switchover of injection when the injection is at operational temperature from the first injection valve 14 to the second injection valve 30 should advantageously be effected at a predetermined intake manifold pressure $p_{um}$, which is located slightly above the point of supercharged full load, or in other words at the beginning of the supercharging range of the compressor 5, and is measured by means of the pressure sensor 28 at the intake manifold section 6 between the compressor 5 and the throttle valve 7 and transferred to the electronic control unit 21.

Figure 2:
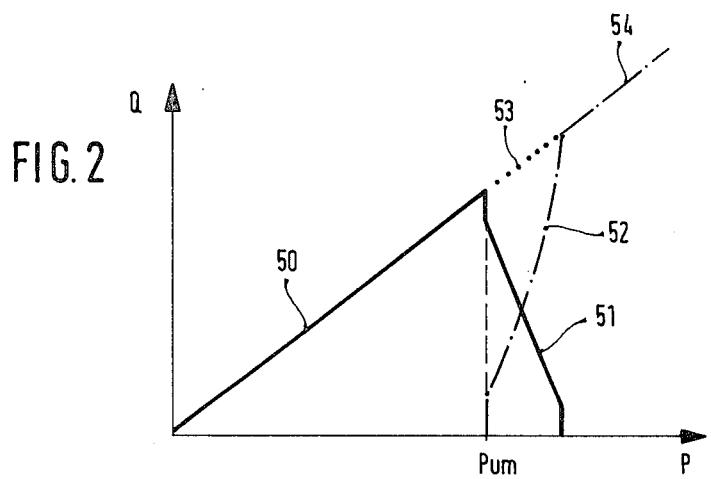
FIG. 2 is a diagram showing the supplied fuel quantity Q in accordance with the intake pressure manifold p when a slow increase in load is occurring.

In FIG. 2, a diagram is shown which indicates the fuel quantity Q injected into the engine in accordance with the load, characterized by the intake manifold pressure p. Above the operating temperature of the engine, beginning with the idling range of the engine, a steadily increasing fuel quantity Q is injected via the first injection valve 14 in accordance with the solid line 50 when a slow increase in load is occurring. If the predetermined intake manifold pressure $p_{um}$ for the switchover from the first injection valve 14 to the second injection valve 30 has been attained, then the first injection valve 14 is triggered by the electronic control unit 21 in such a manner, in accordance with a predetermined function over time, that the quantity of fuel injected via the first injection valve 14 is reduced as indicated by the solid line 51 shown by way of example, while in accordance with the same function over time operating in the reverse direction, the second injection valve 30 is triggered by the electronic control unit 21 in such a manner that it begins to perform injection, and the injection via the second injection valve 30 upstream of the compressor 5 is increased as indicated by the dot-dash line 52. The sum of the fuel quantities injected via the first injection valve and via the second injection valve 30 during this transitional function should correspond to the required fuel quantity indicated by the dotted line 53. After the end of the predetermined, timed transitional function, the injection then takes place only via the second injection valve 30 as indicated by the dot-dash line 54.

In a corresponding manner, the transition from the second injection valve 30 to the first injection valve 14 when there is a slow reduction in engine load should take place from an operational point above the predetermined intake manifold pressure $p_{um}$ toward an operational range below the predetermined intake manifold pressure $p_{um}$. In so doing, injection is first performed through the second injection valve 30 in accordance with the line 54 as the load drops, until the attainment of the predetermined intake manifold pressure $p_{um}$. Upon the attainment of the predetermined intake manifold pressure $p_{um}$, the electronic control unit 21 triggers the second injection valve 30 in accordance with a timed transitional function in such a manner that the injected quantity of fuel via the second injection valve 30 is reduced taking the course indicated by line 52 but in the opposite direction, and as indicated by line 51 but in the opposite direction the injection of the fuel via the first injection valve 14 begins and is increased. The sum of the quantities of fuel injected via both injection valves 14, 30 should correspond to the required fuel quantity. After the transitional function has elapsed, the injection then takes place only via the first fuel injection valve 14.

Figure 3:
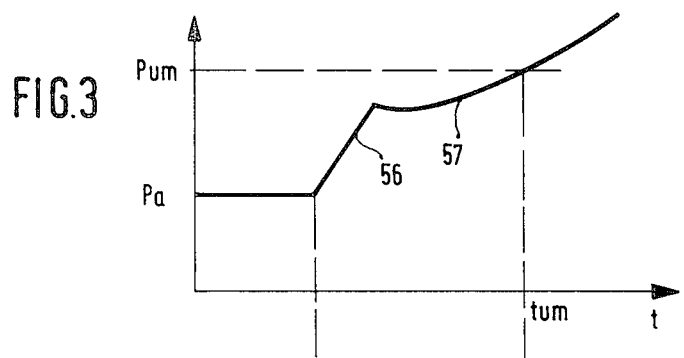
FIG. 3 is a diagram showing the course of the intake manifold pressure over time in the event of an abrupt increase in load.

In FIG. 3, the course of the intake manifold pressure p in the manifold section 6 is plotted over time in the event of an abrupt acceleration process on the part of the engine, beginning at an operating point below the predetermined intake manifold pressure $p_{um}$ and above the engine operating temperature. Beginning at an intake manifold pressure $p_a$ in the intake manifold section 6, the intake manifold pressure p increases sharply at first if there is an abrupt opening of the throttle valve 7 as indicated by curve segment 56, and then attains the predetermined intake manifold pressure $p_{um}$ approximately as indicated by the non-linear curve segment 57.

Figure 4:
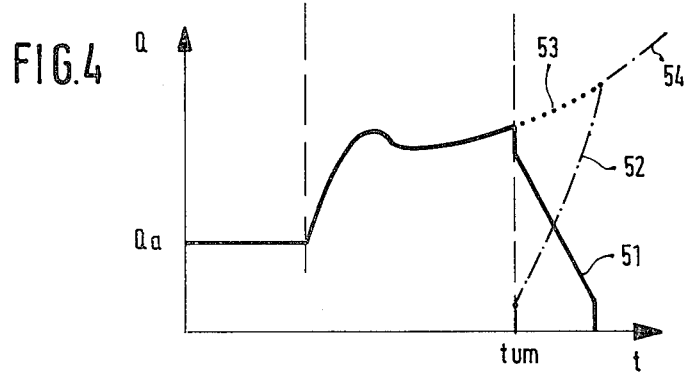
FIG. 4 is a diagram showing the course of the fuel supply over time in the event of an abrupt increase in load.

In FIG. 4, in a corresponding manner, the increase in the injected fuel quantity Q over time is shown in the event of an abrupt acceleration process from an operating point below the predetermined intake manifold pressure $p_{um}$. At a constant intake manifold pressure, $p_a$, the fuel quantity $Q_a$ is first injected via the first injection valve 14. Upon an abrupt acceleration of the engine, that is, the opening of the throttle valve 7, the first injection valve 14 is triggered by the electronic control unit 21 in a manner known in fuel injection systems, in accordance with the curve segment 59 in such a manner that a richer fuel-air mixture required for acceleration is produced. If after the time $t_{um}$ the predetermined intake manifold pressure $p_{um}$ is attained, then the switchover from the first injection valve 14 to the second injection valve 30 and then the exclusive injection via the second injection valve 30 take place in accordance with the switchover function already described in connection with FIG. 2 and as illustrated by the lines 51, 52. In an equivalent manner, if there is an abrupt reduction in engine load from an operating point above the predetermined intake manifold pressure $p_{um}$, first the quantity of fuel injected via the second injection valve 30 is reduced, until the attainment of the predetermined intake manifold pressure $p_{um}$. Upon the attainment of the predetermined intake manifold pressure $p_{um}$, the injection of fuel via the second injection valve 30 should then be reduced, as indicated by the lines 51, 52 but in the opposite direction and in accordance with the timed transitional function, and injection via the first injection valve 14 begins and is increased. Following the end of the transitional functions, the injection then takes place only via the first injection valve 14.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method of mixture formation for mixture-compressing internal combustion engines that include an air inlet, an air intake manifold connected to said air inlet, a throttle valve in said intake manifold, a compressor disposed in said intake manifold upstream of said throttle valve, a first fuel injection valve upstream of said throttle valve and a second fuel injection valve upstream of said compressor comprising the steps of activating said first fuel injection valve upon starting said engine for injecting fuel into said intake manifold upstream of said throttle valve until predetermined engine operating parameters have been obtained, activating said second fuel injection valve for injecting fuel into said intake manifold upstream of said compressor upon reaching second predetermined engine operating parameters, simultaneously operating said first fuel injection valve and said second fuel injection valve until reaching third predetermined engine operating parameters, inactivating said first fuel injection valve upon reaching said third predetermined engine operating parameters, and operating said first and second fuel injection valves during predetermined engine operating parameters, wherein only said first fuel injection valve is activated at engine operating parameters at which said engine is below the operating temperature.

2. A method as defined by claim 1, characterized in that following the attainment of the operating temperature of the engine when the engine is operated below a predetermined intake manifold pressure ($p_{um}$) downstream of the compressor, the fuel feeding is effected only via the first fuel supply element.

3. A method as defined by claim 2, characterized in that the event of a slow increase in engine load from the time the predetermined intake manifold pressure ($p_{um}$) is attained, the fuel feeding via the first fuel supply element is reduced in accordance with a predetermined function, and in an adapted manner the fuel feeding via the second fuel second fuel supply element begins and is increased, so that the sum of the fuel quantities fed via both fuel supply elements corresponds to the required fuel quantity.

4. A method as defined by claim 2, characterized in that in the event of an abrupt acceleration process of the engine, beginning at an operating point below the predetermined intake manifold pressure ($p_{um}$) until the attainment of the predetermined intake manifold pressure ($p_{um}$), an increased fuel quantity is fed via the first fuel supply element and beyond the attainment of the predetermined intake manifold pressure ($p_{um}$) the fuel feeding via the first fuel supply element is reduced in accordance with a predetermined function and the fuel feeding via the second fuel supply element begins and is increased in an adapted manner, so that the sum of the fuel quantities fed by the two fuel supply elements corresponds to the required fuel quantity.

5. A method as defined by claim 1, characterized in that after the attainment of the engine operating temperature when the engine is operated above a predetermined intake manifold pressure ($p_{um}$) downstream of the compressor, the fuel feeding is effected only via the second fuel supply element.

6. A method as defined by claim 5, characterized in that in the event of a slow reduction of the engine load, from an operating point above the predetermined intake manifold pressure ($p_{um}$), the fuel feeding via the second fuel supply element is reduced beyond the point of attainment of the predetermined intake manifold pressure ($p_{um}$) in accordance with a predetermined function and the fuel feeding via the second fuel supply element begins and is increased in an adapted manner, so that the sum of the fuel quantities fed by the two fuel supply elements corresponds to the required fuel quantity.

7. A method as defined by claim 5, characterized in that in the event of an abrupt reduction of engine load from an operating point above the predetermined intake manifold pressure ($p_{um}$) until the attainment of the predetermined intake manifold pressure ($p_{um}$), a reduced fuel quantity is fed via the second fuel supply element, and beyond the predetermined intake manifold pressure ($p_{um}$) the feeding of fuel via the second fuel supply element is reduced and in an adapted manner the fuel feeding via the first fuel supply element begins and is increased, so that the sum of the fuel quantities fed by the two fuel supply elements corresponds to the required fuel quantity.

8. A method as defined by claim 1, 2, 5, 3, 4, 6 or 7 characterized in that an electromagnetically actuatable fuel injection valve serves as the fuel supply element.

9. A method as defined by claim 8, characterized in that the fuel pressure present at the first fuel injection valve is regulatable in accordance with the intake manifold pressure (p) between the compressor and the throttle valve, and the fuel pressure present at the second fuel injection valve is regulatable in accordance with atmospheric pressure.

10. A fuel supply system for mixture-compressing internal combustion engines, comprising an intake manifold, a throttle valve in said intake manifold, a compressor (turbocharger) disposed in said intake manifold upstream of said throttle valve, a first fuel supply element disposed directly upstream of said throttle valve, and a second fuel supply element disposed directly upstream of said compressor, and engine parameter control means for exclusively operating said first fuel supply element when said engine is operating at a temperature below a predetermined operating temperature.

11. A fuel supply system as defined by claim 10 which includes control means connected to said intake manifold downstream of said compressor which controls said first and second fuel supply elements for feeding fuel into said intake manifold in accordance with the intake manifold pressure (p) downstream of the compressor when said engine is operating at a temperature above a predetermined temperature.

12. A fuel supply system as defined by claim 11, characterized in that above a predetermined intake manifold pressure ($p_{um}$), the fuel feeding is effected only via the second fuel supply element.

13. A fuel supply system as defined by claim 12, characterized in that in the event of an abrupt reduction in engine load, beginning at an operating point above the predetermined intake manifold pressure ($p_{um}$) until the attainment of the predetermined intake manifold pressure ($p_{um}$), a reduced fuel quantity is fed via the second fuel supply element, and beyond the predetermined intake manifold pressure ($p_{um}$) the feeding of fuel via the second fuel supply element is reduced and in an adapted manner the feeding of fuel via the first fuel supply element begins and is increased, so that the sum of the fuel quantities fed via the two fuel supply elements corresponds to the required fuel quantity.

14. A fuel supply system as defined by claim 11, characterized in that below a predetermined intake manifold pressure ($p_{um}$), the fuel feeding is effected only via the first fuel supply element.

15. A fuel supply system as defined by claim 14, characterized in that in the event of a slow increase in engine load, beyond the attainment of the predetermined intake manifold pressure ($p_{um}$), the fuel feeding via the first fuel supply element is reduced in accordance with a predetermined function, and in an adapted manner the fuel feeding via the second fuel supply element begins and is increased, so that the sum of the fuel quantities fed via the two fuel supply elements corresponds to the required fuel quantity.

16. A fuel supply system as defined by claim 14, characterized in that in the event of an abrupt acceleration process of the engine, beginning at an operating point below a predetermined intake manifold pressure ($p_{um}$) until the attainment of the predetermined intake manifold pressure ($p_{um}$), an increased fuel quantity is fed via the first fuel supply element, and beyond the predetermined intake manifold pressure ($p_{um}$), the fuel feeding via the first fuel supply element is reduced in accordance with a predetermined function, and the fuel feeding via the second fuel supply element begins and is increased in an adapted manner, so that the sum of the fuel quantities fed by both fuel supply elements corresponds to the required fuel quantity.

17. A fuel supply system as defined by claim 14, characterized in that in the event of a slow reduction in engine load, beginning at an operating point above the predetermined intake take manifold pressure ($p_{um}$), the feeding of fuel via the second fuel supply element is reduced beyond the attainment of the predetermined intake manifold pressure ($p_{um}$) in accordance with a predetermined function, and the fuel feeding via the first fuel supply element begins and is increased in an adapted manner, so that the sum of the fuel quantities fed by both fuel supply elements corresponds to the required fuel quantity.

18. A fuel supply system as set forth in claim 10, 11, 14, 12, 15, 16, 17 or 13, characterized in that an electromagnetically actuatable fuel injection valve serves as the fuel supply element.

19. A fuel supply system as defined by claim 10, which includes a pressure regulating valve disposed in a fuel supply line leading to the first and second injection valves, the pressure regulating valve regulating the pressure of the fuel flowing to the first injection valve in accordance with the intake manifold pressure (p) between the compressor and the throttle valve and regulating the pressure of the fuel flowing to the second injection valve in accordance with atmospheric pressure.

20. A fuel supply system as defined by claim 19, in which: said pressure regulating valve includes a yielding wall, said yielding wall cooperating with a valve seat, said yielding wall being subjected on one side to the pressure of the fuel in the fuel supply line and being acted upon on another side by a regulating spring and by pressure in a pneumatic control line.

21. A fuel supply system as defined by claim 20 which includes: a switchover valve disposed in a pneumatic control line, said switchover valve being electromagnetically triggered to connect said pneumatic control line with said intake manifold section between the compressor and the throttle valve when injection is occurring via the first injection valve and with the atmosphere when injection is occurring via the second injection valve.

* * * * *